United States Patent
Zeweke et al.

(10) Patent No.: US 9,004,499 B2
(45) Date of Patent: Apr. 14, 2015

(54) PASSIVELY CONTROLLED ADJUSTABLE RIDE HEIGHT SUSPENSION

(71) Applicant: GM Global Technology Operations LLC, Detroit, MI (US)

(72) Inventors: Robert E. Zeweke, Shelby Township, MI (US); Andrew R. Krenz, Northville, MI (US); Richard J. Lannen, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 67 days.

(21) Appl. No.: 13/919,244

(22) Filed: Jun. 17, 2013

(65) Prior Publication Data

US 2014/0367930 A1 Dec. 18, 2014

(51) Int. Cl.
| | |
|---|---|
| *B60G 7/02* | (2006.01) |
| *B60G 7/04* | (2006.01) |
| *B60G 17/00* | (2006.01) |
| *B60G 17/016* | (2006.01) |
| *B60G 17/056* | (2006.01) |

(52) U.S. Cl.
CPC ............ *B60G 17/00* (2013.01); *B60G 17/016* (2013.01); *B60G 2200/14* (2013.01); *B60G 2204/62* (2013.01); *B60G 2500/30* (2013.01); *B60G 2204/129* (2013.01); *B60G 17/0565* (2013.01)

(58) Field of Classification Search
CPC .......... B60G 17/0525; B60G 17/0565; B60G 2500/30; B60G 2500/302; B60G 2500/202; B60G 2202/154; B60G 2204/129; B60G 7/04
USPC .......... 280/5.514, 5.502, 5.506, 5.507, 5.508, 280/5.513, 6.15, 6.157, 6.159, 6.16, 280/124.161, 124.106; 180/41; 267/64.16, 267/64.17, 64.19, 64.27; 701/37, 38
See application file for complete search history.

(56) References Cited

U.S. PATENT DOCUMENTS

| | | | | | |
|---|---|---|---|---|---|
| 3,028,174 | A | * | 4/1962 | Gawronski | ................. 267/64.21 |
| 3,980,316 | A | * | 9/1976 | Yates | ..................... 280/124.106 |
| 5,921,532 | A | * | 7/1999 | Pierce et al. | ................ 267/64.19 |
| 2005/0110227 | A1 | * | 5/2005 | Stefan et al. | ................ 280/5.501 |
| 2008/0252025 | A1 | * | 10/2008 | Plath | ......................... 280/5.514 |

* cited by examiner

*Primary Examiner* — Keith Frisby
(74) *Attorney, Agent, or Firm* — Quinn Law Group, PLLC

(57) ABSTRACT

A suspension system for a vehicle having a vehicle body and a road wheel includes a suspension corner connecting the road wheel to the vehicle body. The suspension corner maintains contact between the road wheel and a road surface. The suspension system includes a bladder arranged at the suspension corner for pumping a fluid in response to forces generated at the wheel and holding a volume of the fluid. The suspension system also includes an accumulator in fluid communication with the bladder for selectively accumulating the fluid pumped by and releasing the fluid to the bladder. The suspension system additionally includes a valve for selectively retaining the accumulated fluid in and releasing thereof from the accumulator. The height of the bladder varies in response to the volume of fluid being held by the bladder to set a ride height of the vehicle at the suspension corner.

20 Claims, 5 Drawing Sheets

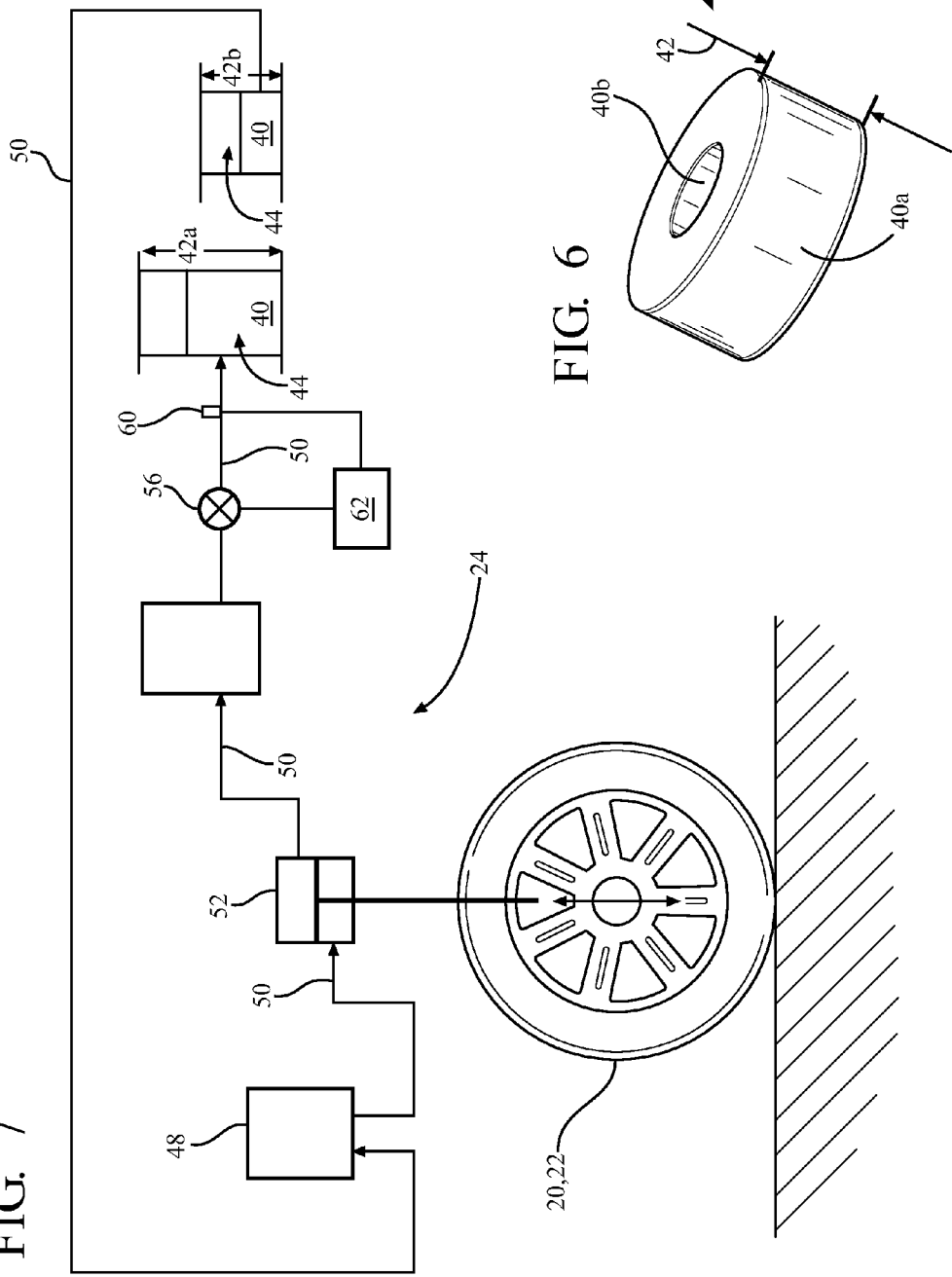

PASSIVELY CONTROLLED ADJUSTABLE RIDE HEIGHT SUSPENSION

TECHNICAL FIELD

The present disclosure relates to a passively controlled adjustable ride height suspension for a vehicle.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface. Additionally, the design of the suspension also influences the height of the vehicle body relative to the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

SUMMARY

A suspension system for a vehicle having a vehicle body and a road wheel includes a suspension corner connecting the road wheel to the vehicle body. The suspension corner is configured to maintain contact between the road wheel and a road surface. The suspension system includes a bladder arranged at the suspension corner, characterized by a variable height, and configured to pump a fluid in response to forces generated at the wheel and hold a volume of the fluid. The suspension system also includes an accumulator in fluid communication with the bladder. The accumulator is configured to selectively accumulate the fluid pumped by the bladder and subsequently on demand release the fluid back into the hydraulic system that fluidly connects the accumulator to the bladder. The suspension system additionally includes a valve in fluid communication with the accumulator. The valve is configured to selectively retain the accumulated fluid in and release the accumulated fluid from the accumulator. The height of the bladder varies in response to the volume of the fluid being held by the bladder, i.e., is selectively inflated and deflated by the fluid, thereby setting a height of the vehicle body relative to the road surface, i.e., a ride height, at the suspension corner.

The suspension system may additionally include a sensor configured to detect the volume of the fluid held by the bladder and generate a signal indicative of the volume. Furthermore, the suspension system may include a controller configured to receive the signal indicative of the volume of the fluid held by the bladder and regulate the valve to selectively accumulate and release the fluid by the accumulator.

The suspension corner may include a control arm connecting the wheel to the vehicle body and a damper arranged between the control arm and the vehicle body. The damper used in the suspension corner is configured to cushion forces being generated at the wheel as the vehicle traverses the road surface. Furthermore, the forces generated at the wheel as the vehicle traverses the road surface may displace the control arm and in turn actuate the bladder to pump the fluid.

The accumulator may be mounted to one of the vehicle body and the damper.

The bladder may include a general ring shape defining a hollow middle section. Additionally, the damper may include a fastening member that extends through the middle section.

The bladder may be arranged between the damper and the body and in such a case the fastening member is secured to the body.

The bladder may be arranged between the damper and the control arm and in such a case the fastening member is secured to the control arm.

The bladder may include a first bladder and a second bladder. In such a case the first bladder may be arranged between the damper and the body and the second bladder may be arranged between the damper and the control arm.

The body may include a first pocket arranged to accept the first bladder and the control arm may include a second pocket arranged to accept the second bladder.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 6 is a schematic perspective view of the bladder.

FIG. 7 is a schematic illustration of the hydraulic circuit configured to control the suspension system.

DETAILED DESCRIPTION

Figure 1:
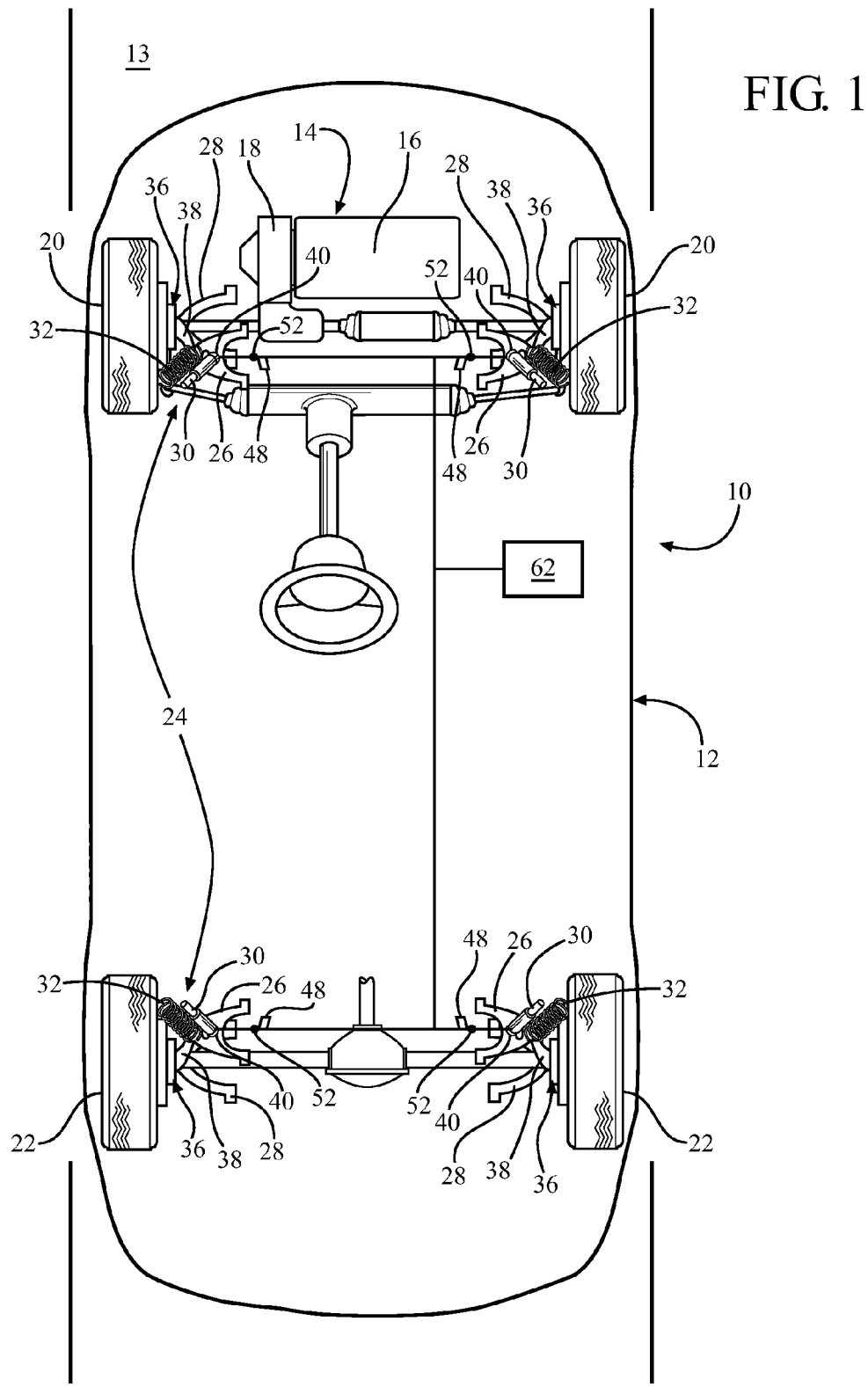
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. The suspension system 24 may include an upper control arm 26, a lower control arm 28, a shock absorber or damper 30, and a spring 32 connected to each of the front and rear wheels 20, 22. Although a specific configuration of the suspension system 24 is shown in FIGS. 1-3, other vehicle suspension designs are similarly envisioned, such as using a strut 34, as represented by an individual suspension corner 36 shown in FIGS. 4-5).

The suspension system 24 also includes a plurality of knuckles 38, each configured to support a respective road wheel 20, 22 via a wheel hub and bearing assembly (not shown). FIGS. 2-3 depict the representative corner 36 of the suspension system 24, which includes a representative knuckle 38. Each knuckle 38 may be operatively connected to the body 12 via the upper control arm 26 and the lower control arm 28, and have its motion in response to road input controlled by the combination of a shock absorber, a.k.a., damper 30 and spring 32, or the strut 34. The damper 30 or strut 34 is configured to cushion or dampen forces being generated at the wheel 20, 22 as the vehicle 10 traverses the road surface 13.

Figure 2:
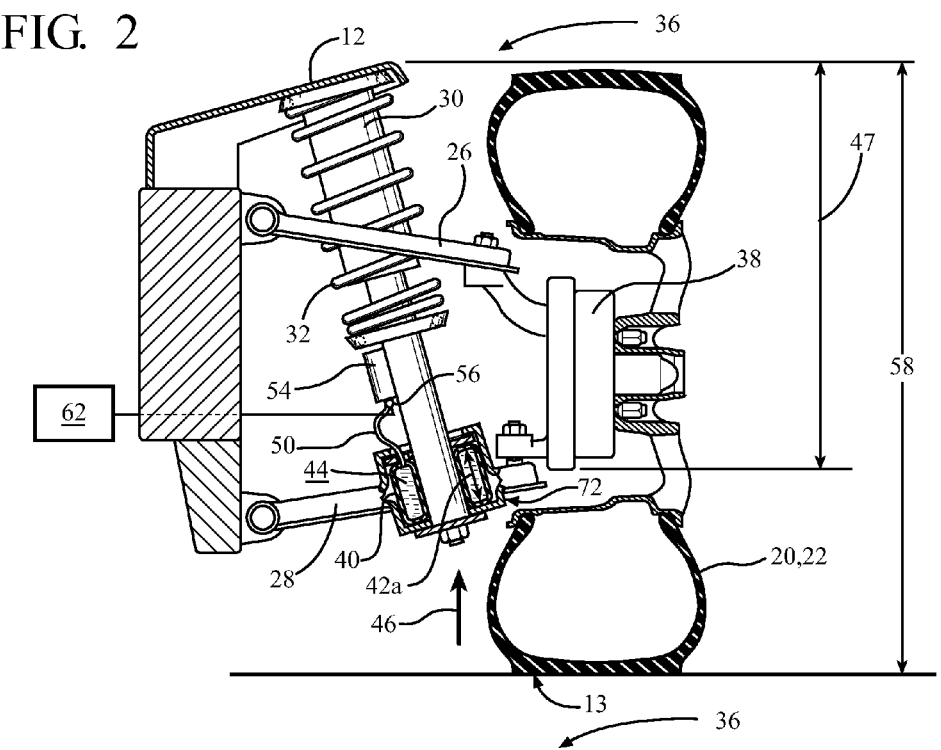
FIG. 2 is a schematic cross-sectional illustration of one type of a suspension corner of the vehicle shown in FIG. 1 having a spring, a damper, a control arm, and an inflatable bladder in an inflated state, wherein the bladder is disposed between the damper and the control arm.
Figure 3:
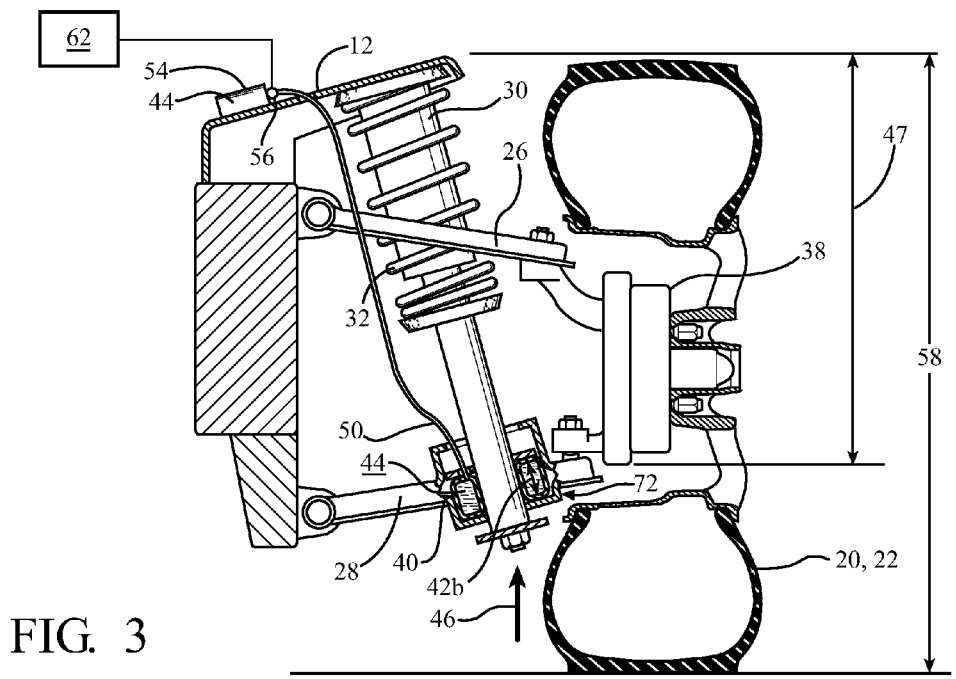
FIG. 3 is a schematic illustration of the suspension corner shown in FIG. 2, wherein the bladder is shown in a deflated state.
Figure 4:
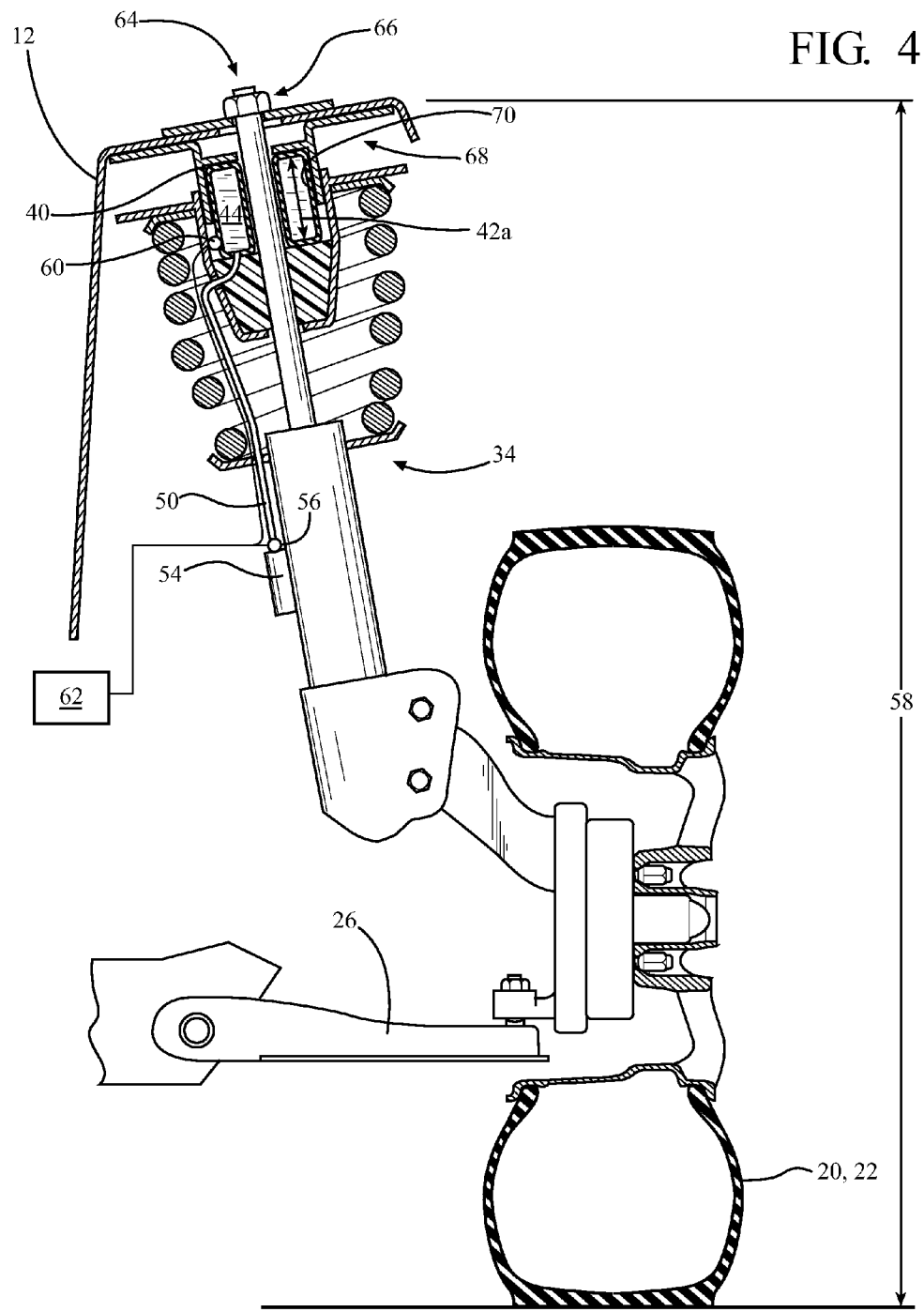
FIG. 4 is a schematic cross-sectional illustration of another type of suspension corner shown in FIG. 1 having a strut, a control arm, and an inflatable bladder in an inflated state, wherein the bladder is disposed between the strut and the vehicle body.
Figure 5:
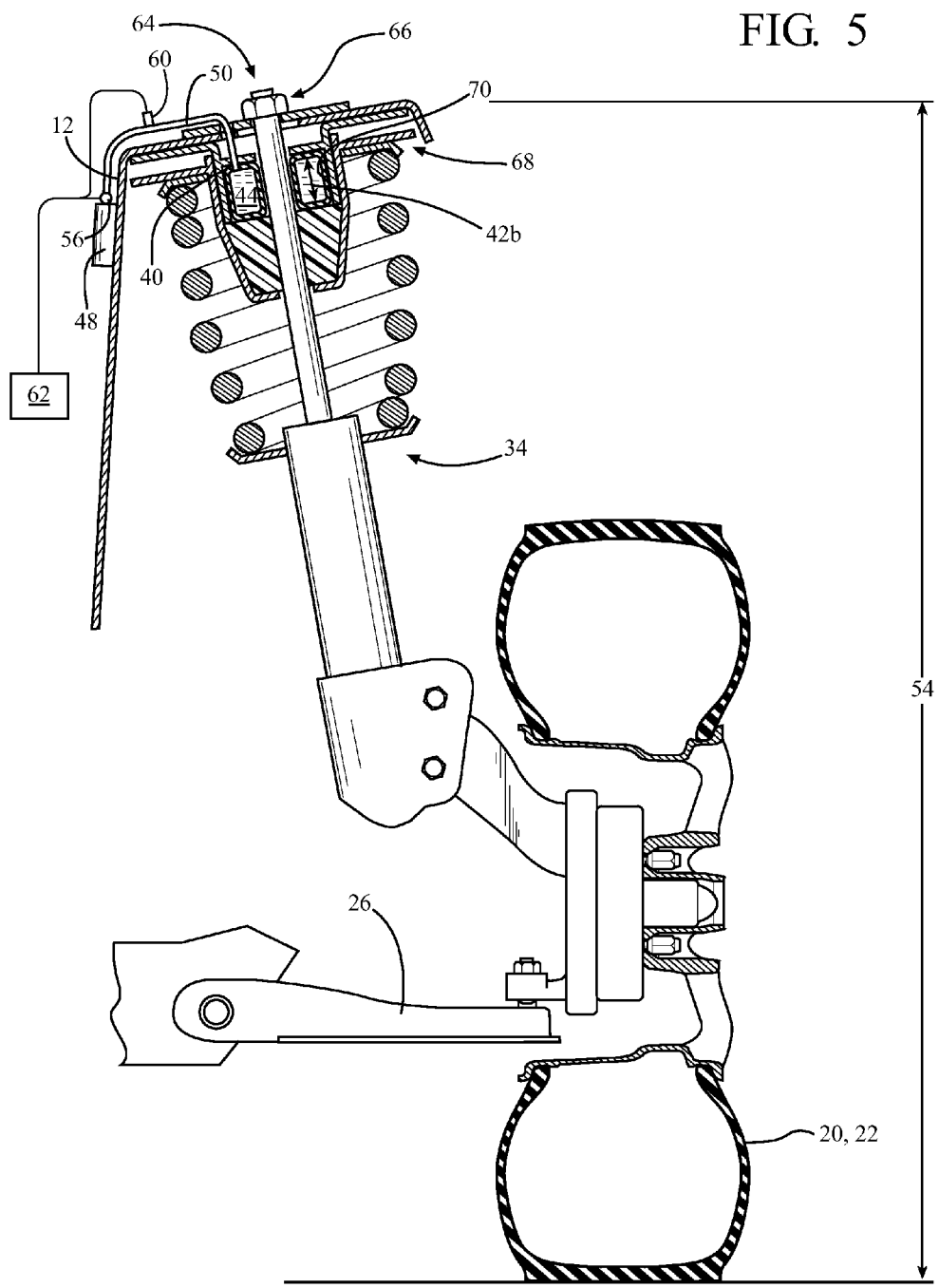
FIG. 5 is a schematic cross-sectional illustration of the suspension corner shown in FIG. 4, wherein the bladder is shown in a deflated state.

As shown in FIGS. 2-6, the suspension system 24 also includes a bladder 40 arranged at each suspension corner 36. The bladder 40 constitutes a container that is finable by a fluid and configured to selectively expand in volume as additional fluid 44 is retained therein and contract as the fluid is removed therefrom. The bladder 40 is characterized by a variable height 42 (shown in FIG. 6), wherein inflated height 42*a* is shown in FIGS. 2 and 4, and deflated height 42*b* is shown in FIGS. 3 and 5. The bladder 40 is positioned in line with the damper 30 or strut 34. The bladder 40 is configured to pump a fluid 44 in response to forces and displacement 46 generated at the wheel 20, 22 as the vehicle 10 traverses the road surface 13 and the wheel moves vertically with respect to the road surface. At any time during operation of the vehicle 10, the bladder 40 generally holds a volume of the fluid 44. The volume of the fluid retained by the bladder 40 establishes an effective distance 47 between the lower control arm 28 and the vehicle body 12.

As shown in FIG. 7, the suspension system 24 additionally includes a reservoir 48 in fluid communication with the bladder 40 via a system of fluid tubes 50. The reservoir 48 is configured to collect the fluid 44 pumped by the bladder 40 and subsequently on demand release the fluid back into the fluid tubes 50. A pump 52 is in fluid communication with the reservoir 48 via a fluid tube 50. The pump 52 pressurizes the fluid 44 received from the reservoir 48 and delivers the pressurized fluid to an accumulator 54. The accumulator 54 is controlled by a valve 56 to selectively accumulate or retain the pressurized fluid 44 and when prompted to release the fluid to the bladder 40. The valve 56 may be a one-way pressure valve that may be regulated by a controller that will be described in greater detail below. Accordingly, the height 42 of the bladder 40 is varied in response to the volume of the fluid 44 being supplied thereto from the accumulator 54 via the valve 56. Furthermore, as the bladder 40 selectively inflates and deflates with the fluid 44, the changing height 42 of each bladder sets a height of the vehicle body 12, i.e., 58, relative to the road surface 13 at each suspension corner 36. The height 42 of the bladder 40 may be varied by the valve 56 in discrete intervals or height steps, or varied substantially infinitely as deemed necessary.

As shown in FIGS. 4-5 and 7, the suspension system 24 may also include a sensor 60 configured to detect the volume of the fluid 44 held by the bladder 40, for example by sensing fluid pressure. The sensor 60 may also generate a signal indicative of the volume of the fluid 44 held by the bladder 40. As additionally shown in FIG. 1, the vehicle 10 includes a controller 62 configured to receive the signal generated by the sensor 60. Furthermore, the controller 62 regulates the valve 56 to selectively accumulate and release the fluid 44 retained by the accumulator 54. The controller 62 may be a standalone control unit dedicated to regulating the valve 56 in order to vary the ride height 58 in response to road conditions, vehicle speed, and other pre-set variables, a vehicle body controller, or an integrated vehicle central processing unit. Such pre-set variables may be selected and then appropriate vehicle ride height 58 empirically established for each variable during testing and development of the vehicle 10 for subsequent programming into the controller 62.

As shown in FIGS. 2-3, the damper 30 may be arranged between the lower control arm 28 and the vehicle body 12. Accordingly, the forces generated at the wheel 20, 22 displace the lower control arm 28 and in turn actuate and cycle the bladder 40 such that the volume of the fluid 44 contained within the bladder is pumped out. As shown in FIG. 2, the accumulator 54 may be mounted to the damper 30 or to the vehicle body 12 (as shown in FIG. 3). In the case where the suspension corner 36 employs the strut 34, the accumulator 54 may be similarly mounted to the strut (as shown in FIG. 3) or to the vehicle body 12 (as shown in FIG. 5). As shown in FIG. 6, the bladder 40 includes a general ring shape 40*a* defining a hollow middle section 40*b*. The damper 30 includes a fastening member 64 that extends through the middle section 40*b* and uses a complementary threaded nut 66 for retention of the damper to the vehicle 10.

As shown in FIGS. 4-5, in the case that the bladder 40 is arranged between the strut 34 and the vehicle body 12, the fastening member 64 is secured via the threaded nut 66 to the vehicle body 12, such as at the shock tower 68. Although in FIGS. 4-5 the bladder 40 is arranged between the strut 34 and the body 12, as in the embodiment of FIGS. 2-3, the bladder may also be arranged between the damper 30 and the lower control arm 28. As shown, the fastening member 64 extends through the lower control arm 28 and is then secured to the control arm via the threaded nut 66. The suspension system 24 may also include more than one bladder 40 at each corner 36. Each corner 36 may include one bladder 40 arranged between either the damper 30 or the strut 34 and the vehicle body 12, and also include the second bladder 40 arranged between the damper or strut and the lower control arm 28. Such twin-bladder configuration permits greater range in the variation of the ride height 58 for the vehicle 10. As shown in FIGS. 4-5, the vehicle body 12 includes a first pocket 70 arranged to accept the first bladder 40 and, as shown in FIGS. 2-3 the control arm includes a second pocket 72 arranged to accept the second bladder 40.

The controller 62 may be programmed to selectively regulate delivery of the fluid 44 into the first and/or second bladders 40 depending on the desired ride height 58 based on the road conditions, the speed of the vehicle 10, and the general performance expected from the vehicle by its operator. Accordingly, the suspension system 24 provides a cost effective approach to regulating vehicle ride height by capturing kinetic energy generated by the suspension's articulated movement. Additionally, the suspension system 24 may facilitate reduction of fuel consumption of the vehicle 10 as a result of the reduced ride height that favorably impacts the vehicle's coefficient of air drag. Furthermore, the suspension system 24 achieves regulation of the vehicle ride height without resorting to the complexity of a full pneumatic suspension that generally eschews standard springs and dampers.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body;
   a road wheel configured to maintain contact with a road surface;
   a vehicle suspension corner connecting the road wheel to the vehicle body and configured to maintain contact between the road wheel and the road surface;
   a bladder arranged at the suspension corner, characterized by a variable height, and configured to pump a fluid in response to forces generated at the road wheel and hold at least a volume of the fluid;
   an accumulator in fluid communication with the bladder and configured to selectively accumulate the fluid pumped by the bladder and release the fluid to the bladder; and
   a valve in fluid communication with the accumulator and configured to selectively retain the accumulated fluid in and release the accumulated fluid from the accumulator;
   wherein the height of the bladder varies in response to the amount of the fluid being held by the bladder, thereby setting a height of the vehicle body relative to the road surface at the suspension corner.

2. The vehicle according to claim 1, further comprising:
   a sensor configured to detect the volume of the fluid held by the bladder and generate a signal indicative of the volume; and
   a controller configured to receive the signal indicative of the volume of the fluid held by the bladder and regulate the valve to selectively accumulate and release the fluid by the accumulator.

3. The vehicle according to claim 1, wherein the corner includes a control arm connecting the road wheel to the vehicle body and a damper arranged between the control arm and the vehicle body and configured to cushion forces being generated at the road wheel as the vehicle traverses the road surface, and wherein the forces generated at the road wheel displace the control arm and in turn actuate the bladder to pump the fluid.

4. The vehicle according to claim 3, wherein the accumulator is mounted to one of the vehicle body and the damper.

5. The vehicle according to claim 3, wherein the bladder includes a general ring shape defining a hollow middle section, wherein the damper includes a fastening member that extends through the middle section.

6. The vehicle according to claim 5, wherein the bladder is arranged between the damper and the vehicle body, and wherein the fastening member is secured to the vehicle body.

7. The vehicle according to claim 5, wherein the bladder is arranged between the damper and the control arm, and wherein the fastening member is secured to the control arm.

8. The vehicle according to claim 1, wherein the bladder includes a first bladder and a second bladder.

9. The vehicle according to claim 8, wherein the first bladder is arranged between the damper and the vehicle body and the second bladder is arranged between the damper and the control arm.

10. The vehicle according to claim 9, wherein the vehicle body includes a first pocket arranged to accept the first bladder and the control arm includes a second pocket arranged to accept the second bladder.

11. A suspension system for a vehicle having a vehicle body and a road wheel, the suspension system comprising:
    a vehicle suspension corner connecting the road wheel to the vehicle body and configured to maintain contact between the road wheel and a road surface;
    a bladder arranged at the suspension corner, characterized by a variable height, and configured to pump a fluid in response to forces generated at the wheel and hold at least a volume of the fluid;
    an accumulator in fluid communication with the bladder and configured to selectively accumulate the fluid pumped by the bladder and release the fluid to the bladder; and
    a valve in fluid communication with the accumulator and configured to selectively retain the accumulated fluid in and release the accumulated fluid from the accumulator;
    wherein the height of the bladder varies in response to the volume of the fluid being held by the bladder, thereby setting a height of the vehicle body relative to the road surface at the suspension corner.

12. The suspension system according to claim 11, further comprising:
    a sensor configured to detect the volume of the fluid held by the bladder and generate a signal indicative of the volume; and
    a controller configured to receive the signal indicative of the volume of the fluid held by the bladder and regulate the valve to selectively accumulate and release the fluid by the accumulator.

13. The suspension system according to claim 11, wherein the corner includes a control arm connecting the road wheel to the vehicle body and a damper arranged between the control arm and the vehicle body and configured to cushion forces being generated at the road wheel as the vehicle traverses the road surface, and wherein the forces generated at the road wheel displace the control arm and in turn actuate the bladder to pump the fluid.

14. The suspension system according to claim 13, wherein the accumulator is mounted to one of the vehicle body and the damper.

15. The suspension system according to claim 13, wherein the bladder includes a general ring shape defining a hollow middle section, wherein the damper includes a fastening member that extends through the middle section.

16. The suspension system according to claim 15, wherein the bladder is arranged between the damper and the vehicle body, and wherein the fastening member is secured to the vehicle body.

17. The suspension system according to claim 15, wherein the bladder is arranged between the damper and the control arm, and wherein the fastening member is secured to the control arm.

18. The suspension system according to claim 11, wherein the bladder includes a first bladder and a second bladder.

19. The suspension system according to claim 18, wherein the first bladder is arranged between the damper and the vehicle body and the second bladder is arranged between the damper and the control arm.

20. The suspension system according to claim 19, wherein the vehicle body includes a first pocket arranged to accept the first bladder and the control arm includes a second pocket arranged to accept the second bladder.

\* \* \* \* \*